United States Patent [19]
Feisullin et al.

[11] Patent Number: 5,949,988
[45] Date of Patent: Sep. 7, 1999

[54] PREDICTION SYSTEM FOR RF POWER DISTRIBUTION

[75] Inventors: Farid Feisullin, Chatham; Bruce Naylor, Bedminster; Ajay Raukumar, New Providence; Lois Rogers, S. Orange, all of N.J.

[73] Assignee: Lucent Technologies Inc., Murray Hill, N.J.

[21] Appl. No.: 08/838,221

[22] Filed: Apr. 3, 1997

Related U.S. Application Data

[60] Provisional application No. 60/021,842, Jul. 16, 1996.

[51] Int. Cl.$^6$ ..................................................... G06F 17/50
[52] U.S. Cl. .............. 395/500.23; 342/359; 395/500.39; 455/506
[58] Field of Search ........................... 364/578; 395/500; 342/359; 343/703; 455/52.3

[56] References Cited

U.S. PATENT DOCUMENTS

| | | | |
|---|---|---|---|
| 5,313,568 | 5/1994 | Wallace et al. | 395/126 |
| 5,491,644 | 2/1996 | Pickering et al. | 364/514 R |
| 5,574,466 | 11/1996 | Reed et al. | 342/359 |

OTHER PUBLICATIONS

Raymond J. Luebbers, *Propagation for Hilly Terrain Using Wedge Diffraction*, in IEEE Transactions on Antennas and Propagation, vol. Ap.–32, No. 9, (Sep. 1984).

Raymond J. Luebbers, *Finite Conductivity Uniform GTD Versus Knife Diffraction in Prediction of Propagation Path Loss*, in IEEE Transaction on Antennas and Propagation, vol. AP–32, No. 1, (Jan. 1984).

Vinko Ereeg, A.J. Rustako, Jr. and R.S. Roman, *Diffraction Around Corners and Its Effects on the Microcell Coverage Area in Urban and Suburban Environments at 900 MHZ, 2 Ghz, and 6 Ghz*, in IEEE Transactions on Vehicular Technology, vol. 43, No. 3. Aug. 1994.

Bruce Naylor, *Constructing Good Partitioning Trees*, Graphics Interface, Toronto,Canada, May 1993 AT&T Bell Laboratories.

*Primary Examiner*—Kevin J. Teska
*Assistant Examiner*—Thai Phan

[57] ABSTRACT

A method for simulating RF energy distribution comprises obtaining a binary tree representation of a geometric environment in three-dimensions and forming a 3-D geometric database model therefrom, obtaining one or more specified receive locations within the 3-D geometric database model where RF energy distribution is desirable, simulating the propagation of an RF signal within the geometric database model, the RF signal being represented as a beam having magnitude and direction, the propagation including querying the database model to trace the beam in the geometric environment; and, determining one or more intersections of the traced beam with one or more receive locations to determine RF energy distribution at the receive locations.

30 Claims, 7 Drawing Sheets

PREDICTION SYSTEM FOR RF POWER DISTRIBUTION

RELATED APPLICATIONS

This application claims the benefit of provisional U.S. patent application Ser. No. 60/021,842, filed Jul. 16, 1996.

FIELD OF THE INVENTION

The present invention relates generally to systems for predicting RF power distribution coverage, and particularly, a visually interactive system for efficiently predicting RF distribution coverage in any environment, e.g., indoor, outdoor, and terrain-type environments and combinations thereof, using ray-beam tracing and partitioning tree represented geometry.

BACKGROUND OF THE INVENTION

Wireless services as a paradigm for mobile computing and communication has gained momentum over the past decade. This has resulted in a host of techniques being proposed for modulating a signal such as FDMA, TDMA and CDMA for frequency, time and code division multiple access respectively. An essential element common to all the above transmitting and coding schemes is distribution of power in various urban, semi-urban, and indoor environments. With the rapid growth of wireless communication, the telecommunication industry is going through another revolution. The ever increasing demand for wireless services in urban and semi-urban areas has created large traffic density in these areas. To satisfy this, multiple transmitters have to be placed within small areas where high traffic densities occur. A simple approach would be to place many transmitters without regard to their locations, but this will increase co-channel and adjacent-channel carrier-to-interference ratios. Determination of 'good' placement of transmitters is an iterative procedure which could be a very costly proposition if performed physically for every site where transmitters need to be placed. This cost increases much more for large outdoor urban and semi-urban environments because of the sheer logistics associated with such placement. Thus, a simulation which quickly computes radio frequency propagation in a geometrically represented model of an environment is highly desirable. Some other benefits of a simulation for a specific geographical site include useful signal propagation characteristics like bit error rate and delay spread profiles from various transmitter locations. Different transmitter characteristics (like power, gain patterns, frequency, etc,) can also be simulated with relative ease. Computation of delay spread includes recording power received by a receiving bin location from multiple paths.

Site specific modelling of urban environments is the representation of city and building environments as geometric databases whereby the buildings and cities are to scale with respect to their surroundings, though not necessarily with the finest geometric detail. A simulation where site specific information is either not available or not modeled is in the realm of statistical modeling. A statistical model for urban environment relies on broad classifications based on information like right angled street corners and very high buildings, but could not assume anything more specific than that. The obvious outcome is that predictions are less accurate. Considering that an urban environment, like downtown Manhattan, could be very complex, merely assuming that the streets are right angled does not suffice. Another method is empirical modeling which is a system requiring even less site specific information than a statistical model. In such a method, however, the prediction results are even less accurate.

In the art, there are a range of 2-dimensional simulation systems for radio propagation in site specific environments. For predicting RF propagation, many simple ray tracing techniques based site specific simulations have been used to compute average path loss and delay spread of the radio signals. One early proposed ray tracing based system which considers site specific geometric databases for propagation, traces paths from the receiver location, which severely restricts the number of receiving stations the system can simulate. In another system, building data with location, height and electrical properties of walls, etc., had been used for propagation prediction. Still other techniques use ray tracing for diffraction as well as for other modes of propagation and others have proposed site specific simulation for indoor propagation. Moreover, ray tracing based schemes have been devised for some radio resource management functions, like handover and channel allocation, and attempts have been made for analyzing the effect of moving from a line-of-sight (LOS) street to a non line-of sight (NLOS) street on the received signal, i.e. the effect of turning a corner in an outdoor environment.

More advanced ray splitting schemes have been proposed to maintain a minimum spatial resolution for rays at the time of its interaction with a wall. The ray splitting takes place at predetermined zonal boundaries. Since the splitting is maintained at a constant spatial resolution, the number of rays increases exponentially with distance traveled. Also, since the concentric surfaces of the zones are predetermined, they do not account for the incident angle a ray makes with the intersecting surface. This can introduce arbitrarily large error due to insufficient subdivision of a ray for large incident angles.

In pure 2-dimensional (2D) geometric representations, rays are only shot in a single plane. Thus, roof reflections (for indoor environments), or ground reflections will not be accounted for. Also, the transmitters and receivers have to be placed in the same plane, resulting in very restricted usage for such a system. To simulate a different height for a transmitter other than the receivers, height could be specifically stored with each geometric entity. Computational formulations for the propagation loss due to such a difference in heights have been derived. For instance, the model known as the two-ray model computes ground reflected rays for outdoor propagation along LOS path and attenuates power analytically rather than geometrically. However, the model fails to account for other reflections like wall reflected rays in urban environments that reach a receiver.

A small variant to the basic 2-D representation is where height information for the polygons defining the buildings is given, allowing extrusion in the third dimension. This is an effective way to represent geometry if the environment has only horizontal and vertical surfaces, but it cannot represent geometries like slanted roofs, cathedral ceilings, domes, and terrain environments.

Most prior art systems as described above for propagation of radio frequency have used some variation of boundary representations (Breps). With Breps, the geometry is defined in terms of vertices and their topological relationship with each other and how that forms edges and faces. This is fine for small environments, but is inefficient for very large geometric databases because the faces are spatially unorganized.

Given the limitations inherent in the 2-D geometric representation models, a full 3-D site specific modelling system that can represent any arbitrarily oriented geometry and simulate RF propagation in 3-D would be highly desirable.

Furthermore, a full 3-D site specific modelling system that can effectively model multipaths including both ground and wall reflected rays, and, that could account for diffraction that is not restricted to a single plane, e.g., around edges of a building or reflections from adjoining buildings which are comparatively higher than the building on which the transmitter is deployed, would be highly desirable.

Additionally, a full 3-D site specific modelling system that can represent any indoor, outdoor and terrain-type environments which have varying elevation at the ground level, e.g. hills, would be extremely desirable.

Moreover, a full 3-D site specific modelling system that is visually interactive to facilitate prediction of RF coverage from various RF transmitter locations would be extremely desirable.

SUMMARY OF THE INVENTION

The instant invention is a visually interactive system that provides for comprehensive 3-D geometric modelling of large urban or sub-urban environments and, that implements the notion of a beam tracing for RF propagation modelling.

The notion of a beam having extents assists the tracer in avoiding geometric entities from falling in between two successive rays due to sampling error inherent to simpler ray tracing techniques. Additionally, in the scheme proposed, surface sampling rates are maintained by adaptively subdividing a beam. The adaptive beam subdivision algorithm is a function of the area subtended by a beam on any surface and the currently remaining power in the beam. The effect of using power for determining subdivision is that a beam is subdivided at a finer resolution if there is a significant component of the initial power remaining in the beam, and at a coarser resolution if the power has attenuated significantly. The effect of maintaining a sampling rate based on the projected area is that the number of child beams spawned from a parent beam is much larger if the incident angle is large, limiting the arbitrarily large errors due to the subtended area approaching infinity, that can otherwise get introduced.

The simulation computes both reflection and transmission paths until the power has attenuated below a user specified threshold. This is in contrast to the prior art which suggests that each reflection results-in a new location to transmit power. This computational mechanism is strongly biased in favor of transmission paths and the computational artifact could result in skewed distribution of power in the environment.

In the system of the invention, the geometry is represented as a Partitioning Tree, which represents an environment as a hierarchy of volumes, allowing very fast determination of a ray (beam) intersection with the closest surface in an environment. The current system has both representation and propagation in 3-dimensions, facilitating arbitrarily oriented geometric environments and a capability for placing transmitters in indoor and outdoor environments, including rooftops, etc., in a cost-effective and highly efficient manner. Advantageously, the invention affords interactive 3-dimensional (3-D) visualization which is very desirable for effective placement of transmitters and receivers in dense urban environments. Some empirical rules can be used for such placement, but they can be quite restrictive. Partitioning Trees provide full 3-D interactive visualization capability including the ability to place transmitters interactively in the environment.

In the invention, the signal is propagated in a broadcast mode from the base station as a source of power. A major advantage is that the propagation algorithm is essentially oblivious to the number and location of receiving bins in the environment. This is manifested in the sub-linear time algorithm which results in computational efficiency achieved for an increase in the number of receiving bins as against most other prior art algorithms where there is a linear increase in computational time for a corresponding increase in number of bins.

Accordingly, it is an objective of the present invention to provide a method for efficiently simulating RF energy distribution comprising:

a) obtaining a binary tree representation of a geometric environment in three-dimensions and forming a 3-D geometric database model therefrom;

b) obtaining one or more specified receive locations within the 3-D geometric database model where RF energy distribution is desirable;

c) simulating the propagation of an RF signal within the geometric database model, the RF signal being represented as a beam having magnitude and direction, the propagation including querying the database model to trace the beam in the geometric environment; and, d) determining one or more intersections of the traced beam with one or more receive locations to determine RF energy distribution at the locations.

Such a full 3-D geometric representation and beam-tracing RF propagation model proposed is cost efficient and highly effective for predicting RF coverage in large urban environments, and advantageously accounts for inter-floor and inter-roof RF propagation in multi-floor buildings. It is also highly effective for predicting RF coverage in complex terrain environments.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
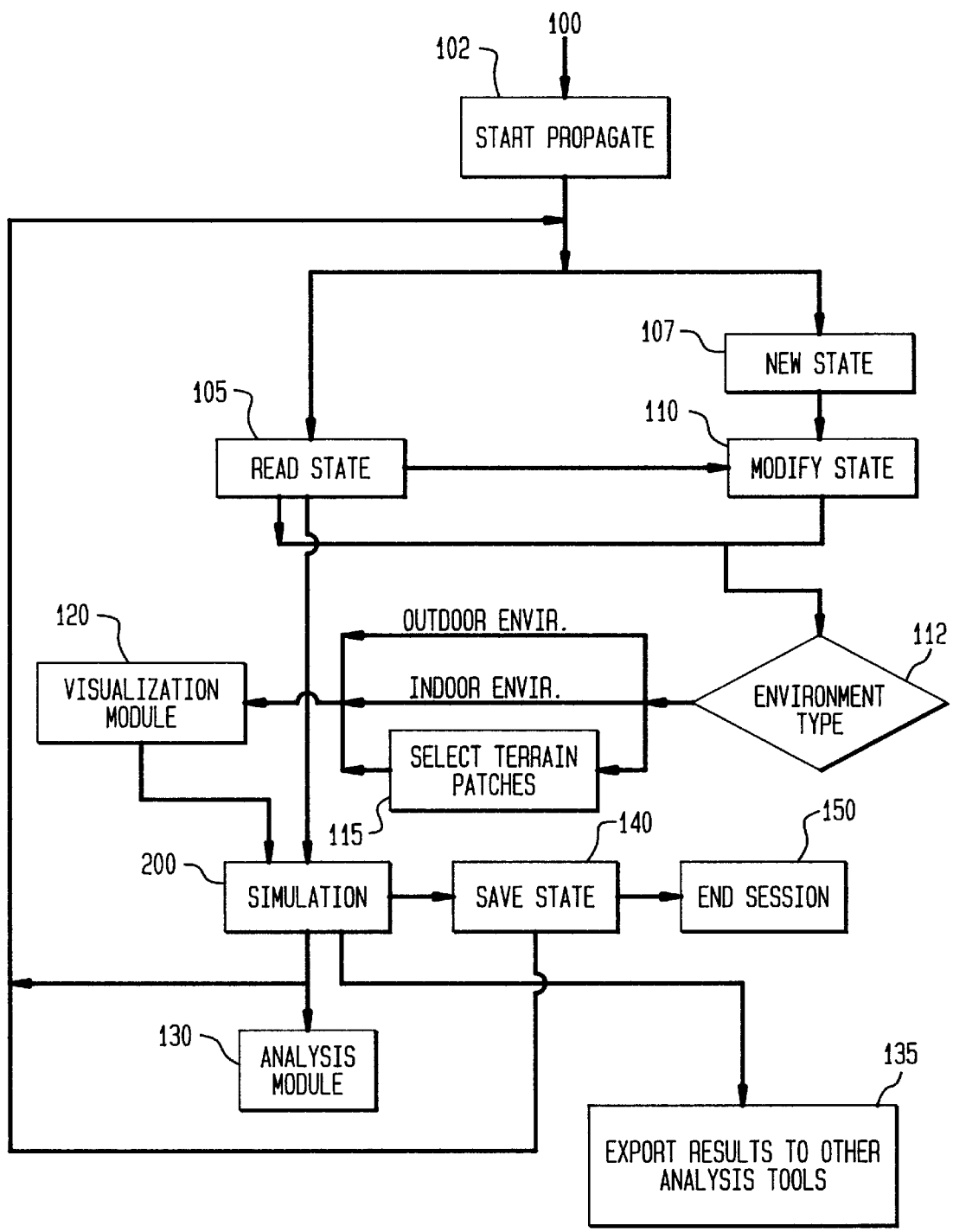
FIG. 1 illustrates a high-level overview of the visually interactive RF energy distribution and predicting system of the invention.

The RF energy distribution and predicting system of the invention is a visually interactive system for accurately predicting RF Propagation coverage in any environment whether it be, indoor, outdoor, urban, and in all types of terrain and, in any combination of these environments. Generally, as depicted in the system overview of FIG. 1, the RF energy distribution and predicting system 100 consists of a start preprocessing stage 102 where a 3-D geometric model of the intended environment is first formulated. This stage consists of utilizing photogrammatic representations of the environment to be modelled, and, implementing mathematical techniques for partitioning the environment in a manner so as to generate a binary trees representation. As will be explained, 3-D partitioning techniques includes generating hyperplanes in a model coordinate system (MCS), e.g. Cartesian coordinate system, for subdividing the environment to be modelled and generating a binary tree representation of the environment. As will be explained, such a binary tree representation facilitates quick and cost-efficient simulation with input sampling ray vectors representing propagating radio-frequency "beams".

In the system 100 of the invention, the RF propagation technique is the broadcast mode whereby input sampling ray vectors or beams of predetermined magnitude and direction are input one at a time and traverse paths of the binary tree geometric model. An algorithm, such as depicted in Appendix A, is implemented to compute the intersection of representative RF ray-beams with polygonal faces in the model, and particularly, how the input ray reflects from, diffracts around, and propagates through the polygonal faces represented in the binary tree. The invention is visually interactive in that the user is able to specify the location of a transmitter or transmitters in 3-D, the broadcast RF power requirements and antenna properties, the amount of broadcast sampling rays, and, the location of a sample plane of RF power receiving bins in 3-D, e.g., six feet off the ground when determining RF coverage for automobile cellular phones. Specifically, the user may seamlessly integrate into the geometric model a representation of the RF power receiving bin locations as any other polygonal surface, however, these surfaces are tagged in the binary tree geometric model so that intersection of ray beam with such a surface will enable the recordation of the RF energy in the propagating beam at those locations and facilitate the determination of RF coverage. More importantly, the algorithm is adaptive in that, child ray-beams may be generated at specific intersected surface locations within the binary tree model depending upon the dimensional area that the originating ray-beam forms with the intersecting hyperplane. Thus, the generation of child ray-beams depends upon the dimensions of the intersecting polygonal face, the angle with which the beam intersects the plane, and the remaining power level of the representative ray-beam at the intersection. This provides for a more accurate determination of RF propagation while, at the same time, saving on computational cost.

As is known in computer science literature, a geometric environment may be represented by constructing a Partitioning Tree which defines the spatial relationship between polygonal faces and encodes these relations in a binary tree. As known to computer scientists, these trees are constructed by recursively subdividing 3-dimensional space by planes as described in W. Thibault, and B. F. Naylor, "Set Operations On Polyhedra Using Binary Space Partitioning Trees," *Computer Graphics*, Vol. 21, Number 4, July 1987, pp. 153–162, the whole contents and disclosure of which is incorporated by reference as if fully set forth herein. Since subdivision generates successively smaller regions of space, the order of planes is chosen such that following a path deeper into the tree corresponds to adding more detail, yielding a multi-resolution representation. This directly leads to efficient ray-intersection computation for propagation as well as visualization.

Figure 2A:
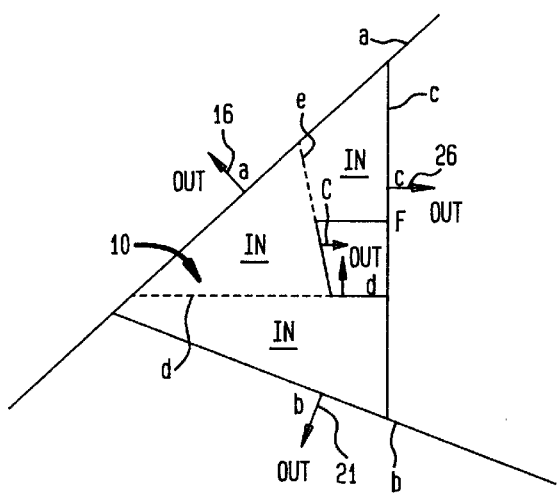
FIG. 2(a) illustrates the partitioning of a single object and the classification of the object by hyperplanes.
Figure 2B:
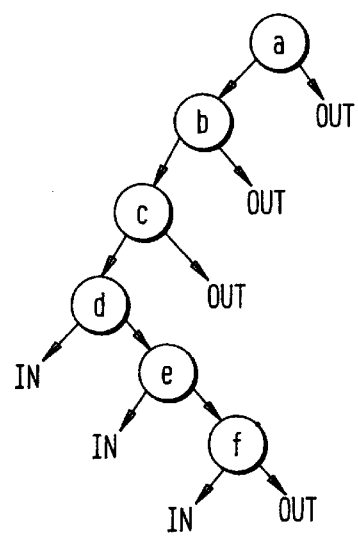
FIG. 2(b) shows the corresponding binary tree structure for the object classified in FIG. 2(a).

The space is partitioned into regions each of which is either totally inside some object or totally outside all objects. An example of a single object with one of its possible partitioning is shown in FIGS. 2(a) and 2(b). Specifically, FIG. 2(a) illustrates the classification of an object 10 by hyperplanes a, b, c, d, e and f which are three dimensional planes in a x,y,z model coordinate system (MCS). The arrows 16,21 and 26 indicate an outward normal of a subdividing hyperplane with 'out' regions corresponding to a subregion of the outward normal. Internal nodes contain the equation of the plane equal to the partition of each region. Leaf nodes correspond to either 'in-cell' or 'out-cell'. FIG. 2(b) illustrates the corresponding binary tree structure for the object 10 containing corresponding nodes a,b and c. At each node, if the child is a leaf then the right branches show 'out' regions and the left branches show 'in' regions. If the child is not a leaf, then the region is further partitioned. Once an environment has been pre-processed to form a Partitioning Tree, complexity of determining the closest surface with any arbitrary ray is a function of the depth of its tree. This is typically O(logn), where n is the number of surfaces in the environment, though the expected case could be even less depending on the environment.

Figure 3A:
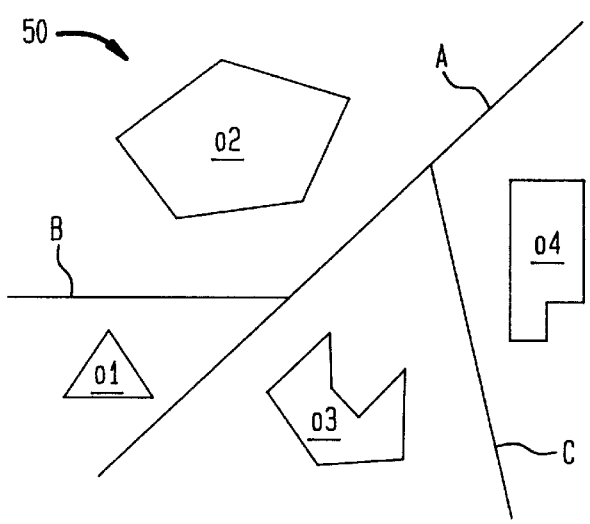
FIG. 3(a) illustrates an arbitrarily oriented geometric environment and defined as a partitioning tree of regions and FIG. 3(b) illustrates its corresponding binary tree structure.
Figure 3B:
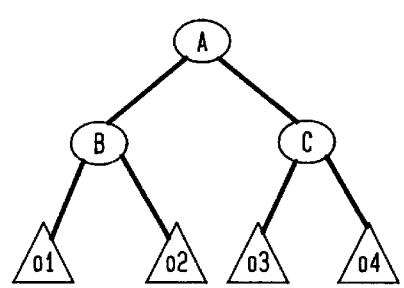

A Partitioning Tree for an example arbitrarily oriented geometric environment 50 having objects o1,o2,o3 and o4 is shown in FIG. 3(a). As shown in FIG. 3(a), recursive partitioning of the geometric space might yield hyperplanes A, B and C. FIG. 3(b) illustrates the corresponding binary tree structure for the environment shown in FIG. 3(a). While the FIG. 3(b) does not show the Partitioning Tree for each object, in fact each object would correspond to a subtree for the single environment tree.

One of the major advantages of the inventive system is that both very coarse and very fine geometric detail can be represented within the same data structure. This hierarchical representation facilitates representation of increasing geometric detail without the attendant computational costs. For example, if there is fine geometric detail in a particular building of an integrated indoor and outdoor environment, Partitioning Tree algorithms will test a ray against the finer detail within the building only if the ray first is known to intersect with this building.

As known to those skilled in the art of computer graphics, one possible criterion for partitioning tree construction is a balanced tree, such that it has least height (which is log(n) for binary trees). This will be optimal only if the geometry is uniformly distributed in the environment. For non-uniformly distributed geometry balanced is not optimal. Instead, the depth of the tree should be correlated to the probability of reaching a region. This is analogous to Huffinan coding technique where higher probability values are assigned shorter codes. As many different partitioning tree constructions can represent the same environment, it is desirable to obtain short paths to large regions and long paths to small regions.

The pseudo code provided in Appendix B herein pertains to the partitioning tree algorithm for converting boundary representations (brep) to binary space partitioning tree (bspt).

One simple heuristic is to use the set of brep faces as candidate hyperplanes, i.e., infinite planes cutting 3 dimensional space and having a direction which is normal to the plane it represents and a scalar 'd' which is the distance from an origin of the model coordinate system. Note that multiple coincident faces are represented by a single hyperplane. Initially all brep faces are in this set and a hyperplane which covers the maximum surface area and results in least splitting of other faces facilitates subsequent intersection queries. Other heuristic methods are discussed in B. F. Naylor, "Constructing Good Partitioning Trees," *Graphics Interface*, Toronto, Canada, May 1993, pp. 181–191, the whole contents and citations contained therein being incorporated by reference herein. However, better trees can be built using an expected cost model.

A combination of heuristic methods and an expected cost model for goodness of a tree can be used to generate a final partitioning tree. Since it is difficult to determine an optimal partitioning hyperplane at each step without evaluating all possible hyperplanes, various heuristic methods help in generating a set of candidate hyperplanes. Then using the expected cost model of goodness, one of the candidate hyperplanes is selected that minimizes expected cost during each subdivision iteration.

In the invention, ray tracing for Partitioning Tree represented environments is directly linked to the classification of the environment in terms of 'in' and 'out' regions. No explicit face intersection is required. A ray is modeled as a finite vector bounded by an environment. This vector is tested for intersection with the plane at each node of the tree reached by the traversal. Initially the region classification for the ray is 'undetermined'. To determine the first intersection, it is desired to put the ray in an 'out-to-in' classification assuming that the ray origin was initially in an 'out' region. The ray traverses the tree until it discovers such an 'out-to-in' transition. For transmission through walls in indoor environments, there results the first two intersections: that is, from 'out-to-in' and then from 'in-to-out' region transition. To determine the second or any successive intersection for the same ray, the query just proceeds to traverse the tree from the last visited node. Similarly, for diffraction in outdoor environments, two intersections are required to find a building corner or rooftop. The pseudo code provided in Appendix A herein gives an algorithm for the ray tracing operation with Partitioning Trees to find the first intersection.

Figure 4A:
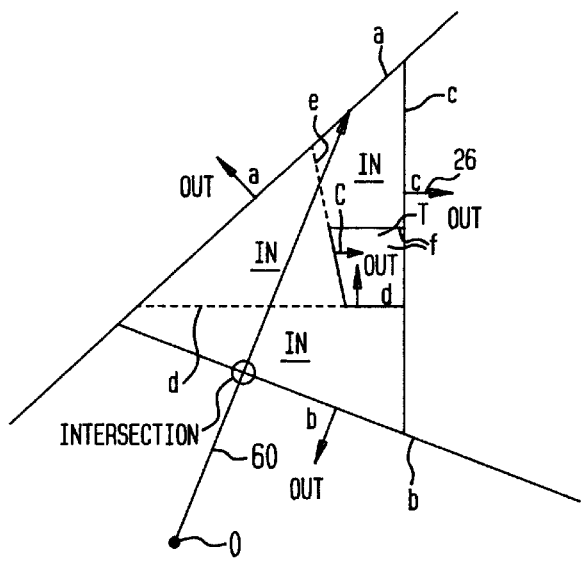
FIG. 4(a) illustrates an example of ray intersecting with the example partitioning tree of FIG. 2(a).

An example of a ray beam 60 intersecting with the example partitioning tree of the object shown in FIG. 2(*a*) is graphically shown in FIG. 4(*a*). As shown in FIG. 4(*a*), the ray beam emanates from an origin, O, in the MCS, and intersects the hyperplane b where indicated. FIG. 4(*b*) shows the corresponding binary space partitioning tree of FIG. 2(*b*) with leaf node regions b and d are identified with ray 60 going from an 'out-to-in' region.

In the system 100 of the invention, a broadcast mode of propagation, whereby an origin for propagating sampling rays corresponding to a base station having an RF source of power, is used for computing the RF signal path. A major advantage is that the propagation algorithm is essentially oblivious to the number and location of receiving bins in the environment, thus resulting in increased computational efficiency. Additional efficiency is achieved because the geometric environment is represented as a hierarchical subdivision of space, as discussed above, wherein the geometry of receiving bins is seamlessly integrated with the environment. This allows a sampling ray to intersect a bin in the same efficient way as it would intersect any other surface. For power attenuation purposes, a bin is treated as an invisible surface which does not attenuate power incident upon it. The system propagates power from a transmitter and tracks its free space attenuation as well as attenuation based on the material properties of the surfaces with which it is interacting.

Figure 5:
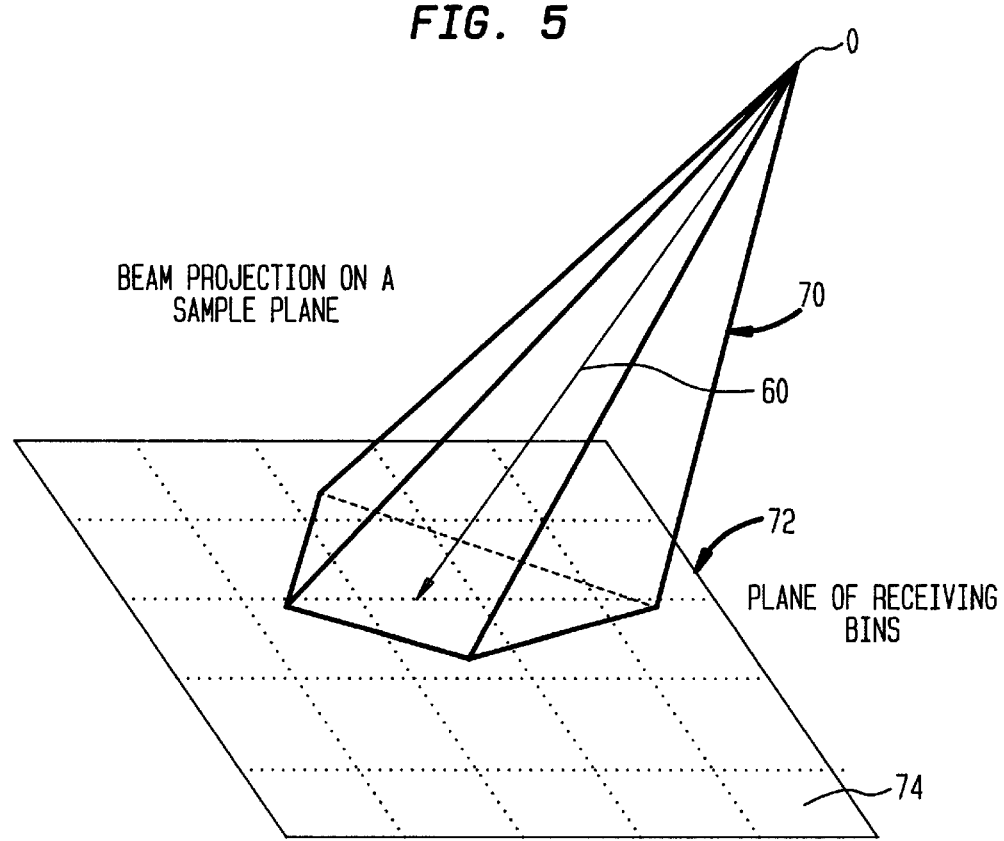
FIG. 5 illustrates a propagating beam projection on a sample plane of receiving bins depositing power.

Broadcast mode of propagation facilitates recording power distribution at multiple layers of sampling planes at different heights. As shown in FIG. 5, a sample plane is defined as a plane of receiving bins 75, e.g., cellular phone cells, at a certain resolution where RF propagation energy is to be sampled. This is a very effective mechanism to get computational optimization for scenarios such as a multi-floor building with inter-floor (or inter-roof) propagation. The only overhead for providing plane(s) or arbitrarily oriented surfaces of receiving bins which could record energy at any resolution or at any height is the time spent in recording power at each of these bins. FIG. 5 illustrates a single ray 60 broadcast from an origin "O" that approximates a beam, and a 3-dimensional polygonal representation of its corresponding beam 70 projecting power on a sample plane 72 containing multiple receive bins 74. As will be described, the resolution of a sampling plane of receive bins 75 is user specified and will depend upon the type of environment. For instance, a sampling plane of 512×512 receive bins at 6' feet above ground may be optimal for a large outdoor or urban environment.

To optimally define the number of rays that need to be output from the transmitter in the broadcast mode, considerations such as over-sampling, i.e., when too large a number of rays are cast and the computations become intractable, and under-sampling, i.e., when the number of sampling rays cast into the environment are sparse and important geometric entities being missed, need to be accounted for. The sampling error problem becomes much more severe if a beam intersects with a surface at large angle with respect to the surface normal, i.e., the projected area tends towards infinity as the incident angle approaches 90 deg. This is due to the fact that a beam subtends an area proportional to the angle between the beam and the surface normal and the extents of a beam increase further upon distance traveled due to multiple reflections and transmissions.

To alleviate the sampling error problem, a mechanism called ray-beam tracing with adaptive subdivision into child beams is utilized. The ray-beam tracing algorithm with adaptive subdivision is described in view of FIGS. 6(*a*) and 6(*b*). Integral in the system of the invention, the transmitter is specified and treated geometrically as a sphere or other polygonal entity having an explicit surface area, rather than just a point. As indicated in FIG. 6(*a*), at step 200, the surface area of the transmitter is initially tessellated (sub-divided) to form of two-dimensional n-sided polygons. For example, as shown in FIG. 7, transmitter entity 80 is tessellated (sub-divided) in the form of rectangular polygons 82, with each beam 90 being defined in three dimensions as a subdivided polygon. As shown in FIG. 7, the apex 84 of a beam 90 is the center of the transmitting source and is constructed using a polygon on the tessellated surface of the transmitter. The initial power of a beam is computed based on both the initial power of the transmitter and the gain pattern a transmitter may have.

Figure 6A:
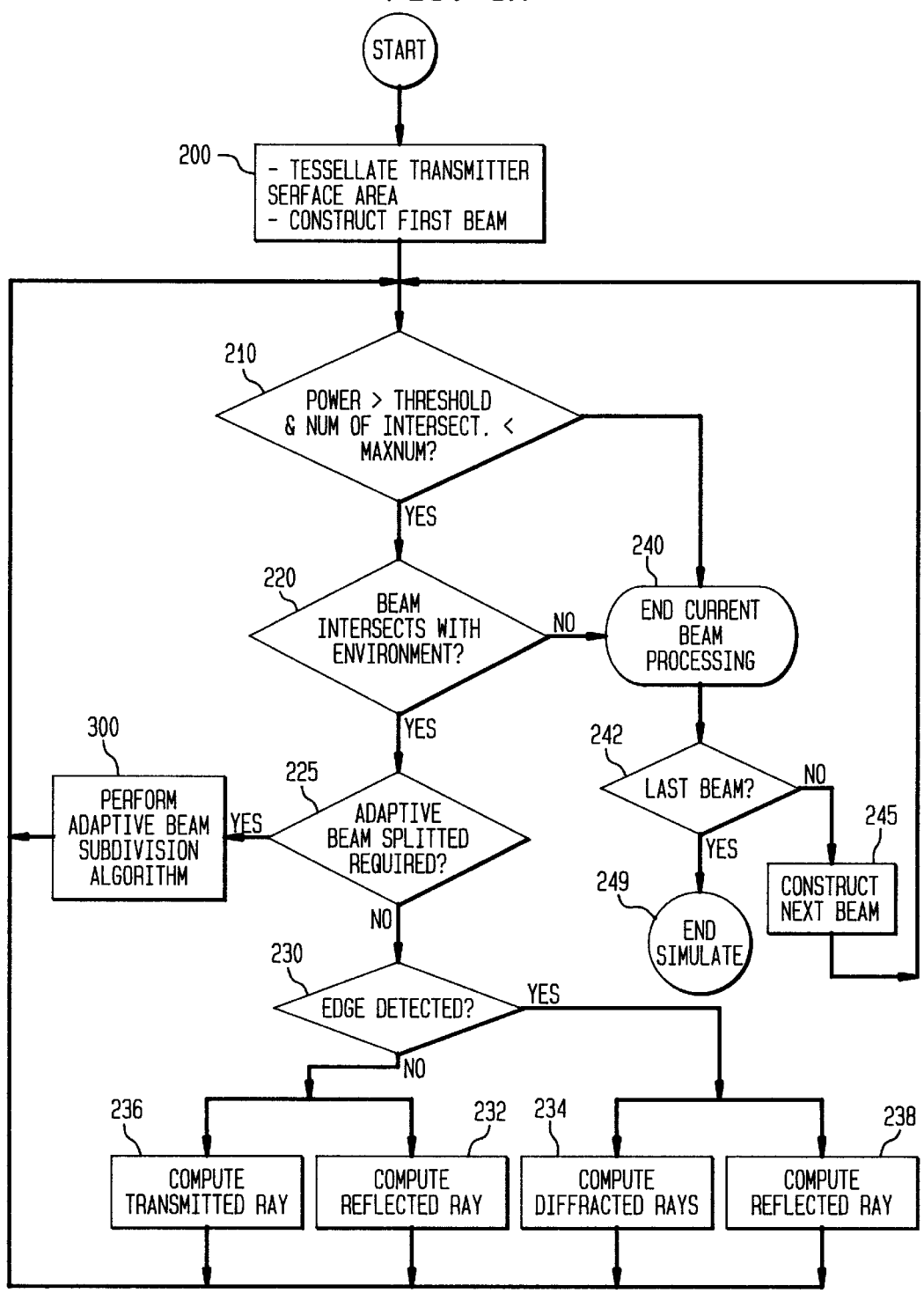
FIG. 6(a) is a high-level description of the ray-beam tracing algorithm of the invention.
Figure 6B:
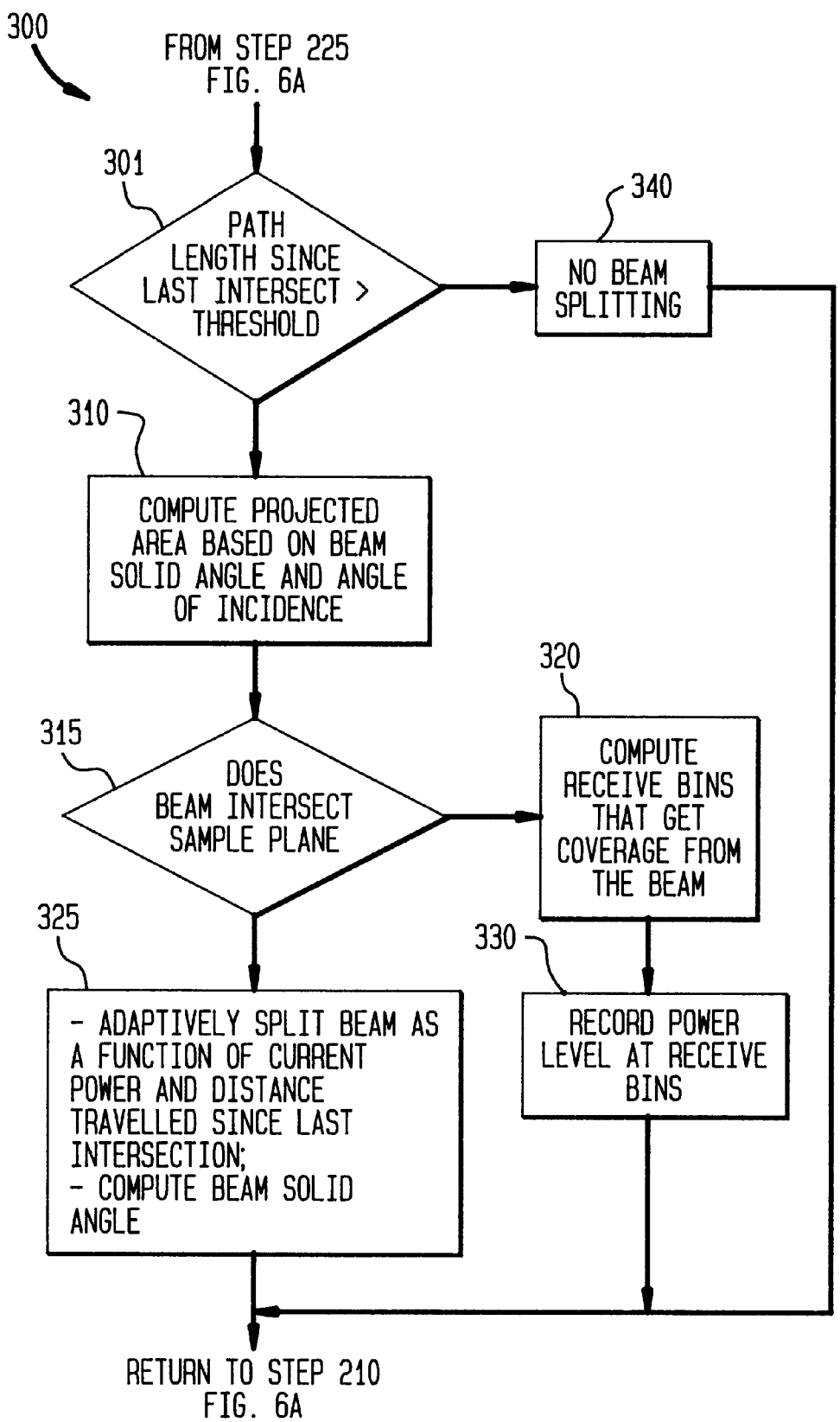
FIG. 6(b) is a high-level description of the adaptive beam subdivision algorithm implemented in the invention.
Figure 7:
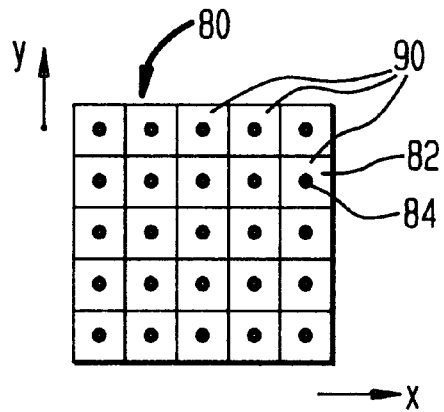
FIG. 7 illustrates a tesselated surface of a transmit antenna.

Central to the ray beam tracing algorithm is that each beam 90 formed from the tessellated transmitter surface, is cast into the geometric database model of the environment and computationally propagated therein. During propagation, the representative vector will intersect hyperplanes or other polygonal surfaces of the modeled environment, and decisions are made as to whether the beam is attenuated, reflected, or diffracted. This is accomplished as follows:

At step 210 in the adaptive ray-beam tracing algorithm of FIG. 6(a), for each beam currently being propagated, a decision is first made as to whether the current power (magnitude) of the beam is above a predetermined user-specified threshold (e.g., −110 dbm for a cellular phone), and, whether the current number of environment intersections for the current beam exceeds a predetermined maximum, e.g., 10–15.

If the algorithm has computed that the current beam has been sufficiently attenuated or that it has intersected the environment enough times, then at step 220, the processing for the current beam will terminate. A decision will then be made at step 242 as to whether the terminated beam was the last beam to be propagated from the tessellated transmitter surface. If the terminated beam was the last beam, then at step 249 the simulation ends and the results of the simulation may be analyzed as described with reference to FIG. 1. If the terminated beam was not the last beam, then at step 245, the next beam from the tesselated surface of the transmitter is constructed and propagated through the environment where its magnitude and direction are determined at step 210.

Figure 4B:
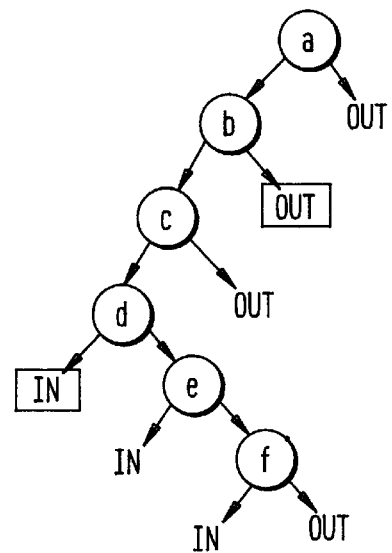
FIG. 4(b) illustrates an example of the leaf node regions identified with the intersecting ray of FIG. 4(a) going from 'out-to-in' region shown in square box.

If, at step 210, the current beam power terminating threshold had not been exceeded, then at step 220, a decision is made as to whether the beam intersects an environment represented in the binary partitioning tree representation (FIG. 4(b)). This essentially consists of automatically querying each node of the binary partitioning tree in the representative geometric database model and determining an intersection with a hyperplane or a point in the tree representing a polygon, e.g., a wall of a building. If the current beam does not intersect a node in the geometric database model, then at step 240, the processing for the current beam ends and steps 242 and 245 to initiate propagation of the next beam. If the current beam did intersect a node in the represented environment, then a decision is made at step 225 to determine if the conditions of the intersecting beam are such that Adaptive beam subdivision is required. As will be explained in view of FIG. 6(b), conditions of distance travelled and angle of incidence for the current intersecting beam will dictate whether adaptive subdivision is necessary.

Figure 9:
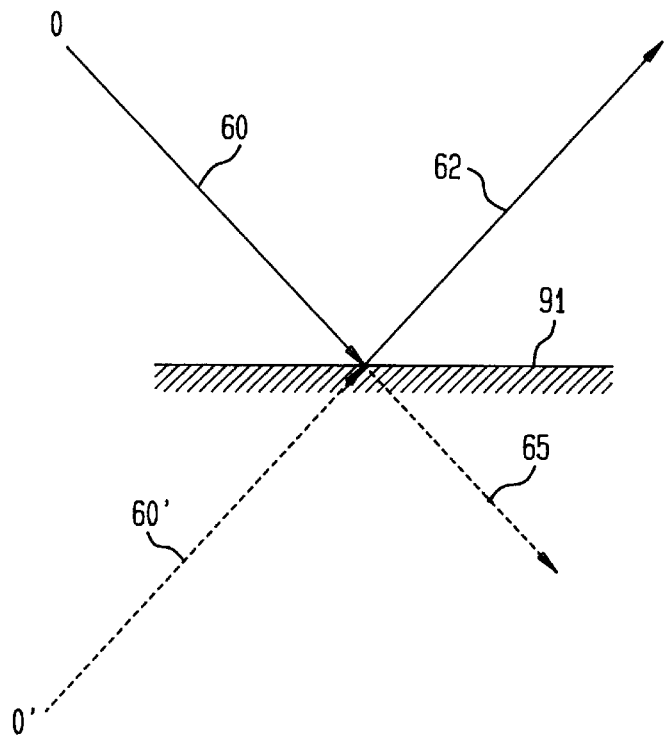
FIG. 9 illustrates reflection and transmission through an object in said environment.
Figure 10A:
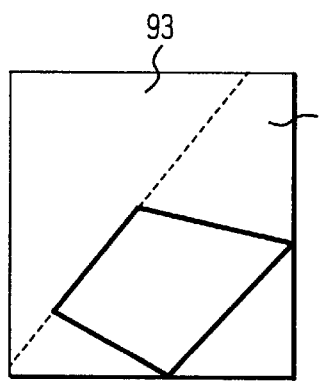
FIG. 10(a) illustrates a 2D binary space partition of the beam extents.
Figure 10B:
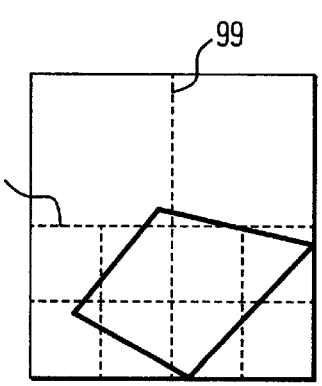
FIG. 10(b) illustrates a Quadtree partitioning binary space partition of the beam extents.
Figure 10C:
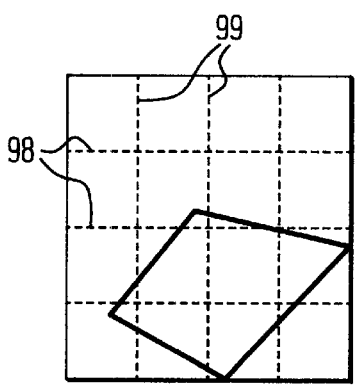
FIG. 10(c) illustrates a Uniform spatial partitioning sheme.

If it is determined at step 225 that Adaptive beam subdivision is not required, then the next step 230 as shown in FIG. 6(a), is to determine whether an edge on the intersecting surface has been detected. If at step 230 it is detected that the intersecting surface is an edge, then it is assumed that a diffraction and reflection event will occur. Thus, at step 234, the algorithm will compute the diffracted rays and the querying process will continue for each diffracted ray generated. Specifically, the algorithm proceeds to compute a multiple number of rays depending upon where the representative ray has intersected the edge surface, with each new ray generated having a different attenuation and direction depending upon the distribution of the diffraction itself and the closeness of the intersecting ray with the edge of the object. Similarly, at step 238, the algorithm will also compute a reflection of the ray off the intersecting object surface. As shown in FIG. 9, for purposes of computing a magnitude and direction for a newly generated diffracted or reflected ray, e.g., intersecting ray 60, a mirror image ray 60' propagating from a virtual origin O', is created with the reflected ray 62 generated as having a magnitude and direction equal to the mirror ray in accordance with the attenuation and angle of incidence to the intersecting surface 91. Additionally, as shown in FIG. 9, the intersecting ray 60 continues propagating within the system as a ray 65 and is treated as continuing through the object surface as if it were a transmission event. The transmitted ray 65 is computed as having a magnitude and direction in accordance with attenuation, refraction, and other material attributes of the intersecting object surface, as well as the angular degree of incidence. After such computation in steps 234 and 238, the algorithm continues by returning to step 210 in order to determine the new power and surface intersection iteration for the original ray, and each of the new diffracted, reflected and or, transmitted rays.

The current scheme of propagation is valid both for indoor as well as outdoor and terrain environments. A signal can propagate in an environment by the following three mechanisms: reflection off any surface (approximation for scattering), transmission through any surface (no refraction), and diffraction around edges of entities like buildings, window frames, and other similar geometric entities. For reasons of computational efficiency, it is assumed that a reflection off a surface is specular rather than diffuse. For diffraction, the Geometrical Theory of Diffraction as described in R. J. Luebbers, "Finite Conductivity Uniform GTD versus Knife Edge Diffraction in Prediction of Propagation Path Loss," *IEEE Transactions on Antenna and Propagation*, Vol. AP-32, No. 1, January 1984, pp. 70–76 and R. J. Luebbers, "Propagation Prediction for Hilly Terrain Using GTD Wedge Diffraction," *IEEE Transactions on Antenna and Propagation*, Vol. AP-32, No. 9, September 1984, pp. 951–955, the whole contents of which are incorporated by reference as if fully set forth herein, is implemented. To compute reflection coefficients in outdoor environments the reflection model described in E. Vinko, A. J. Rustako, Jr., and R. S. Roman, "Diffraction Around Corners and its Effects on the Microcell Coverage Area in Urban and Suburban Environments at 900 MHZ, 2 GHz, and 6 GHz," *IEEE Transactions on Vehicular Technology*, Vol. 43, No. 3, August 1994, pp. 762–766, the whole contents of which are incorporated by reference as if fully set forth herein, is implemented.

If at step 230 in FIG. 6(a), it is determined that the intersecting surface is not an edge, then, at step 232, the algorithm will compute a reflected ray and the querying process will continue for the reflected ray generated. The computation for magnitude and direction of the reflected ray is as described hereinabove. Additionally, as indicated at step 236 in FIG. 6(a), the algorithm will compute a transmitted ray and continue the querying process for the transmitted ray generated. The transmitted ray will have the same direction as the current intersecting ray, however, will have a magnitude based upon the material attributes and resultant attenuation factor stored in the database for the geometric surface. After such computation in steps 232 and 236, the algorithm continues by returning to step 210 in order to determine the new power and surface intersection iteration for the transmitted and reflected ray.

It should be understood that since both indoor and outdoor environments are represented in the same way, propagation could be recorded from transmitters placed outside the building to inside buildings, and similarly, from inside buildings to the outside environment. It has been observed, that unless transmission is being recorded from a transmitter located outside a building to power contribution inside a building, the signal attenuates below the noise level threshold before coming out of the building from the other side. In essence, the buildings are considered opaque and such paths are not traced any further. This artificial truncation of transmissions paths is used as an optimization for coverage in outdoor environments. Also useful as an optimization in indoor environment propagation, diffraction is restricted to certain cases only, depending on the geometric detail available and the wavelength for which the simulation is being performed.

To address the above-mentioned sampling problem, there is a determination at step 225 in FIG. 6(*a*) whether the adaptive beam splitting algorithm is to be invoked for the current beam. In the system 100 of the invention, the adaptive beam subdivision algorithm enables computations of beams for spaces between adjacent rays which could otherwise become arbitrarily large. However, in the system of the invention, the subdivision takes place at some rate on the intersecting surface rather than subdivision of a solid angle of a beam.

Specifically, with reference to sampling beam adaptive subdivision algorithm illustrated in FIG. 6(*b*), it is understood that the beam is first approximated as a ray for intersection purposes with the origin of a beam being the origin of its representative ray vector. The total distance a representative ray travels in MCS till its interaction with a surface determines the extents of the beam. Thus, at step 301, a determination is made as to whether the path length since the last intersection (if any) of the current intersecting beam is greater than some distance threshold (in MCS). If the path length since the last intersection of the current intersecting beam is not greater than some distance threshold, the beam will not be adaptively sub-divided, as indicated at step 340, and the algorithm will continue to step 210 of the ray-beam tracing algorithm in FIG. 6(*a*). If the path length since the last intersection of the current intersecting beam is greater than the distance threshold, the algorithm will proceed to step 310 where the projected extents of the beam based upon the beam solid angle and the angle of incidence are computed. Though the beam is cast in the Model Coordinate System (MCS), for subdivision purposes it is transformed in a Beam Coordinate System (BCS) wherein the origin is the apex of a beam, the direction of the ray vector is the positive z-axis, and the solid angle of the beam is defined as $\theta$ ("Theta") in the x-axis and $\phi$ ("Phi") in the y-axis. Thus, in the system 100, the general notion of a beam is maintained along with sufficient information about the definition of a beam, such that the problem of sampling error associated with ray tracing solution is reduced.

At step 315, a determination is made as to whether the beam has intersected a sample plane of integrated receive bins. The algorithm knows when the beam intersects a sample plane because the receive bins are represented as polygonal surfaces, just like any other surface, however, these surfaces are tagged so the algorithm knows not to attenuate, transmit or reflect the ray from the intersected sample plane surface. Particularly, if the current beam did intersect a sample plane a computation is made at step 320 to determine the density, i.e., number of receive bins in the sample plane that are encompassed by the extent of the beam (area) computed at step 310. For each of the receive bins that the beam extent area covers, the current beam is partitioned in accordance with the sampling resolution, and the power level remaining in the current beam is recorded for each bin location at step 330. Propagation of the current beam continues without any further attenuation at step 210 in FIG. 6(*a*). If the beam does not intersect a sampling plane, then, as indicated at step 325, the beam will be subdivided into several sub-beams or child beams. The size of a child beam is determined by a function defined as a product of the default surface sampling rate (a multiple of wavelength $\lambda$ at which the current simulation is being performed), and a scaling factor determined dynamically based on the remaining energy in the beam. The remaining energy of the beam is determined in accordance with the power of the beam and the distance travelled since the last intersection of the beam. Additionally, the solid angle of the beam (in BCS) is also computed.

After the current beam has been subdivided, then the ray beam tracing algorithm will continue at step 210, FIG. 6(*a*) for each child beam generated.

Figure 8A:
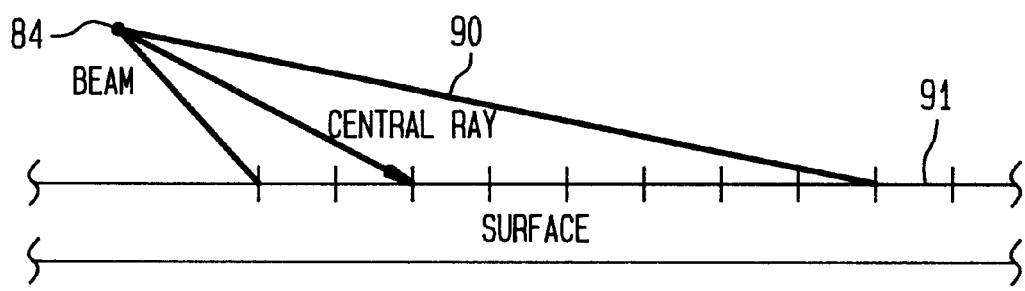
FIG. 8(a) illustrates the ray approximation of a beam and FIG. 8(b) illustrates the beam partitioning into child beams.
Figure 8B:
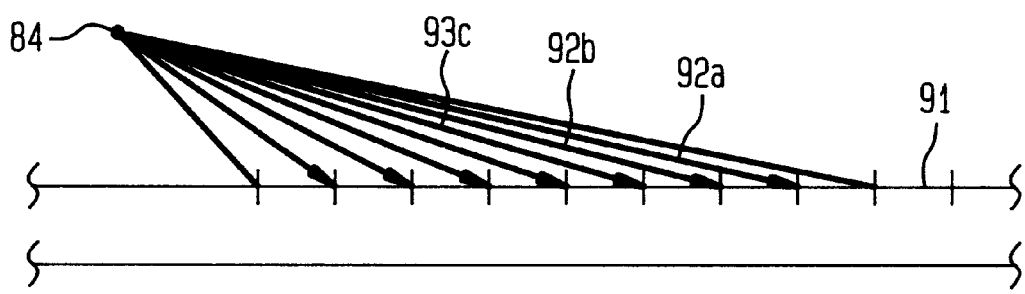

FIG. 8(*a*) illustrates a propagating representative ray approximating a beam 90 and intersecting a surface 91 and FIG. 8(*b*) illustrates beam partitioning into child beams 92 a,b,c, etc.

To maintain a certain rate on the intersecting surface and to exploit spatial correlation of power distribution in adjacent regions, a beam is subdivided or partitioned selectively. Various forms of beam partitioning, such as 2D binary space partitioning, Quadtree positioning and Uniform spatial partitioning are shown in FIGS. 9(*a*), 9(*b*) and 9(*c*), respectively.

In 2D binary space partitioning, a beam upon intersecting a surface is partitioned into 2D convex regions forming sub-beams. The projection of surfaces that fall within the bounds of the beam, on the projection plane in BCS, determine the above partitioning and results in arbitrary sided sub-beam. In FIG. 9(*a*) each enclosed convex region 93 and 94 is a child beam of the parent beam 90.

In Quadtree partitioning, the bounds of a beam are recursively subdivided, projected on the projection plane, into four quadrants. The partitioning is determined based on the desired spatial resolution of a beam. The subdivision continues if there are any edges that still need to be resolved. The size of a quadrant in which the unresolved edge falls should be larger than the current beam partitioning resolution.

In Uniform spatial partitioning, the bounds of a beam are subdivided uniformly depending on the current spatial resolution desired. In both FIGS. 9(*b*) and 9(*c*), new child beam partitions are delineated by the broken horizontal lines 98 and broken vertical lines 99.

The main disadvantage with the first two partitioning schemes is that if the size of an individual beam is not contained, a situation could arise where complete geometric entities get engulfed by a particular beam size. This forces a particular spatial resolution to be maintained, which is greater than or equal to a combination of the density of the receiving bins for the simulation and the detail of geometric entities. A combination of the above partitioning schemes would be the most effective in containing the number of beams to its minimum and still cover the environment sufficiently.

FIG. 1 illustrates a high level architectural control flow diagram for the visually interactive system 100 for simulating RF propagation and predicting energy distribution in a selected environment. As shown in FIG. 1, a first step 102 of the system represents a pre-processing stage whereby a selected indoor, outdoor, or terrain environment represented in 3-D in the MCS, is converted into a binary space partitioning tree representation in the manner as described herein. The visually interactive system 100 is flexible and provides the user with various ways for conducting a simulation depending upon the type of environment where RF coverage is to be simulated. For instance, a user may create a new state as indicated at step 107 by modifying default parameters and setting various simulation parameter values directly, as indicated at block 110. Alternatively, a user may read a previously generated state file for the current selected environment or may be provided with default state parameter settings for the selected indoor or outdoor environment, as indicated at block 105. After reading a state file, the user is still enabled to modify the parameter settings at step 110. As will be explained, a state file contains the following categories of user specified and default simulation parameter information: 1) information about building or elevation database and coverage maps; 2) sample plane (receive bin) information; 3) material attributes for the environment; 4) transmitter information including cell site locations; 5) parameters to control the simulation; and 6) coverage map visualization related information.

As shown in FIG. 1, after reading the state file, the user may directly run a simulation at step 200. Alternatively, a user may visually and interactively conduct the simulation. For example, after reading the state file at step 105 and/or modifying the state simulation parameters for the selected environment at step 110, a user may proceed to the visualization module 120 to enable a 3-D visualization of the environment where RF coverage is desired. It is through this module that a user interactively specifies the coordinates of a RF antenna transmitter in three dimensions, the type of antenna, e.g., dipole, isotropic, etc., the antenna gain pattern, and the number and height of sampling points (receive bins) for the RF prediction coverage. If a terrain environment has been selected for simulation, then after reading or modifying a state by invoking either or both steps 105 or 110, the user may proceed to "Select Terrain Patches" at step 115. The "Select Terrain Patches" block 115 enables the user to select or de-select a patch of terrain for simulation and give basic information about a patch, e.g., latitude-longitude coordinates of a corner, the size of the patch in seconds, the resolution in terms of number of elevation points for the patch, and original units (in feet or meters). Once the user selects the option "Select Terrain Patches" all elevation files in a current Terrain Elevation Directory will be displayed along with a visually recognizable map of the terrain environment.

Simulation parameter information that may be modified for a building database and a Coverage Map for the particular environment include: the name of a directory where images would reside and a scene exists, e.g., a directory about Manhattan or a building(s) located therein; the name of elevation files to be used only for Terrain based models. For every file in this directory, the system will try to read a corresponding terrain file with an extension *.bspt, i.e., the binary space partitioning tree geometric representation for the environment; the name of a directory where the output images and other delay spread or signal files will be stored; the name of a directory containing a reference origin used for construction and subsequent simulation of RF propagation in Terrain environments, e.g., latitude/longitude of the origin for constructing terrain patches; a PathLoss_Flag variable such that, if set TRUE, will instruct the system to predict results to give the actual path loss rather than the signal strength based on the initial power of the transmitter; a Model_Name variable which is the name of the model on which simulation would be performed and which is necessary for Indoor and Outdoor environments only. The integrated terrain model will be constructed by the system at run time for Terrain based environments; an Image_Size variable which is a parameter that determines the number of receive bins at which the power would be sampled, e.g. 32×32, to 512×512, etc. (note that this parameter could be specified in different x and y directions); and, a Num_Of_Sample_Planes variable.

The following four variables which may be modified have to have as many values as the number of intensity planes: a Sample_Plane_Flag variable such that, if set TRUE, will instruct the system that the current plane is used for prediction; a Sample_Plane_Cell_Size variable that determines the size of the receive bin (sample plane size is determined based on the bin size and the image size); a Samples_Per_Unit_Length variable for setting the coarseness of the sampling signal and is inverse of the sampling size; a Sample_Plane_LatLon_Center variable which sets the sample plane center specified in latitude longitude format, e.g., |deg|min|sec|direction|; a Sample_Plane_Center variable which sets the height above ground (floor) in Cartesian coordinates which are particularly relevant for Indoor and Outdoor environments, and, e.g., range from about 6' feet to 8' feet. It should be understood that although these parameters are defined by the user interactively at the preprocessing stage, the binary space partitioning tree is first generated independently, and then, at run time, the tagged polygonal surface representing the sampling plane of receive bins is unified with the tree.

The following variables which may be modified are Material Attribute information for the building database include: a Read_Material_Attributes variable, such that, if set TRUE, indicates that material attributes are to be read from the selected statefile or, if set FALSE, indicates that attributes are available in the building database; and, the Dielectric_Constant and Refract_Constant variables which set the material properties of building(s).

The following variables which may be modified for specifying Transmitter attribute information include: a Single_Transmitter variable, such that, if set TRUE, indicates that the current simulation is to specify only a single transmitter; a Num_Of_Transmitters variable indicates the number of transmitters to be specified in the current simulation; an Antenna_Dir variable which is the name of a directory including the absolute path name where the antenna information files (.pdf files) reside. For each transmitter specified, a Transmitter_Flag variable is set for indicating whether or not the current transmitter is used for prediction; an Antenna_Pattern variable specifies the type of antenna, e.g., Isotropic, Dipole, etc.; a Visual_Antenna_Pattern variable which if set TRUE indicates that the actual geometric pattern is desired and is used only for visualization purposes; an Antenna_Filename variable which specifies the name of the file (.pdf) containing an antenna description with gain values; a Transmitter_Strength variable which specifies antenna strength in milliwatts, e.g. 2000.0 (2 Watts); a Transmitter_Frequency variable which specifies the transmitter frequency in MHZ; a Transmitter_Center_LatLon variable which specifies Latitude, Longitude, and Antenna Height in the format |deg|min|sec|direction|; a Transmitter_Center variable which sets the Latitude, Longitude, and Antenna Height in Cartesian coordinates; a Transmitter_Scale variable which sets a size used for scene visualization; and, a Transmitter_Orientation variable which sets the antenna azimuth (the angle in the horizontal plane) and tilt (the angle with respect to the horizontal plane) in degrees. The zero reference axis is the positive x-axis in a Right Handed Coordinate System.

Other parameter variables which may be modified that control the simulation and relate to prediction information include: an All_Vertical_Walls variable, such that, if set to TRUE, specifies that the geometric model has all vertical walls in Outdoor building databases; a Unit_Distance variable, which sets the distance per modeling database units (in meters), e.g., for terrain based environments, the scaling factor is 100 meters=1 model unit; a Model_Type variable which specifies the environment to be modelled, i.e., Outdoor, Indoor, or Terrain; an Intensity_Type variable which sets how the beam is to intersect the modelled environment, e.g., Composite, LineofSight, FirstReflect, AllReflect, AnyDiffract, AllReflectandTransmit. It should be understood that AnyDiffract would not be valid with Indoor Model_Type and AllReflectandTransmit would not be valid with Outdoor Model_Type. The Composite specification combines all reflections, including Lineofsight and diffraction. For diffraction to show significantly, Samples_Per_Unit_Length should be a large value; a Trace_Type variable which sets the type of sampling rays for simulation, i.e, SingleRay, SolidAngle, or, preferably, AdaptiveSingleRay; a GeometricRep_Type variable which sets the geometry of the tracing beam, e.g., Solid (if the environment is of bspt format), NonSolid (if environment is brep), and DoubleSidedNonSolid (if environment is non-solid but has explicit information about both sides of a wall etc.). Most geometries, especially terrains are converted to type Solid; a Tracing_Depth variable which is a parameter set to promote computational efficiency; a Phi_Steps variable for specifying in the beam coordinate system the number of Phi angle steps, e.g., 90 to 180 degrees and a Theta_Steps variable for specifying in the beam coordinate system the number of Theta angle steps, e.g., 180 to 360; an Edge_Detection_Factor variable for specifying the multiplicative factor in terms of the wavelength for the current simulation, e.g., fifteen (15) times the wavelength (RF frequency); an Edge_Detection_Tolerance variable which is computed internally based on the edge_detection_factor and the wavelength; a Diffiaction_Step_Size variable for specifying the amount of a diffraction in degrees; a Free_Space_Att_Exp for setting the free space attenuation factor, e.g., range 2.0 to 3.0; a Frequency variable for setting the simulated RF propagation frequency in MHZ, e.g., 984.0 would correspond to a wavelength of about 0.3048 meters or 1.0 foot; an Rf_Signal_Threshold variable which sets the minimum power the simulation should register in dBm, e.g., −80 dBm;

The following variables are used for specifying coverage maps visualization information: a Delay_Spread_Flag variable for setting whether multipath delay spread is recorded for; a Delay_Spread_Resolution variable for setting the delay spread interval size in microseconds; a Delay_Spread_Min and Delay_Spread_Max variables for specifying Delay spread starting point and Delay spread ending points, respectively, in microseconds; an Image_Type variable for specifying the image parameters used for visualization, e.g., Independent, CompositeMultiPlaneNormalized, MultiPlaneNormalized, ColorBands, LimitedColorBands. For example, in CompositeMultiPlaneNormalized, each intensity plane is normalized with respect to Intensity_Type Composite, and in MultiPlaneNormalized, each intensity plane is normalized with respect to the maximum intensity in the current simulation; an Rf_Visual_Interval variable for setting the interval within which the intensity may be recorded on a sample plane; and, an Rf_Visual_Range_Array variable for setting the power range for six Color Bands used in visualization, e.g., the color bands currently being used are |green|dark blue|light blue|cyan|red|yellow|white|.

At the time a state file is read, the RF coverage predicting system checks if the directories set in the statefile are consistent with the existing directory structure of the current environment. For example, the following directories may be checked for consistency: Terrain Type environments which include directories containing: elevation files; .bspt terrain files; output files; and antenna gain pattern files; and, Outdoor and Indoor Type environments which include directories containing the environment; output files; and antenna gain pattern files. At the prompt by the system, the user could set the directories properly.

As shown in FIG. 1, after the user specifies the environment and all of the simulation parameters (blocks 105 and 110) including the coverage maps for visualization (block 115), the simulation is run at block 200 in the manner described for computing RF energy distribution for the selected environment. After the simulation is performed, the results from the prediction may be further analyzed and downloaded at block 130 to an analysis module, or, the results may be exported to other analysis tools at step 135. Particularly, from the recorded power levels at each sample plane of receive bins (described herein with reference to FIGS. 6(a) and 6(b)), it is readily determined where RF coverage is strong or deficient. The user is enabled to store the current state in a user defined filename at block 140 or, may start the simulation process over by returning to step 105 and/or steps 107/110 for further modification of some or all of the above-described simulation parameters. For instance, after analyzing the results from a previous simulation, the user may want to run a new simulation with the addition of a second transmitter, or, with changes to the location, gain, and/or gain pattern attributes of the previously simulated transmitter. The user may end the simulation at block 150 after performing the simulation run(s).

The foregoing merely illustrates the principles of the present invention. Those skilled in the art will be able to devise various modifications, which although not explicitly described or shown herein, embody the principles of the invention and are thus within its spirit and scope.

APPENDIX A

```
global: near-classification, far-classification
near-classification = UNDETERMINED
Ray_Intersect_Bspt: Ray ray, Bspt T → Point p
{
    IF T == a cell
    THEN
        IF near_classification == UNDETERMINED
        THEN
            near-classification = cell.classification
        {IN or OUT}
        ELSE
            far-classification = cell.classification
        END
    ELSE
        Locate_Ray_wrt_Hp (ray, T.Hp)
        IF ray.origin ∈ NegHspace
        THEN
            near_subtree = T.neg_subtree
            far_subtree = T.pos_subtree
        ELSE
            near_subtree = T.pos_subtree
            far_subtree = T.neg subtree
        END
```

APPENDIX A-continued

```
        IF ray ∈ {NegHspace, PosHspace}
        THEN
                Ray_Intersect_Bspt (ray, near_subtree)
        ELSEIF ray ∈ BothHspace
                p = Compute_Ray_Hp Intersection (ray, T.Hp)
                Ray_Intersect_Bspt (ray, near_subtree)
                IF near_classification == far_classification
                || far_classification == UNDETERMINED
                THEN
                        p = Ray_Intersect_Bspt (ray, far_subtree)
                ELSE
                        RETURN p
                END
            END
        END
}
```

APPENDIX B

```
Brep-to-Bspt: Brep b–Bspt T
{
        IF b == NULL
        THEN
                T = a cell
        ELSE
                h = Choose_Hyperplane(b)
                {b⁺, b⁻, b⁰,} = Partition_Brep(b, h)
                T.faces = b0
                T.pos_subtree = Brep_to_Bspt(b⁺)
                T.neg_subtree = Brep_to_Bspt(b⁻)
        END
}
```

What is claimed is:

1. A method for simulating RF energy distribution comprising:
   a) obtaining a binary tree representation of a geometric environment in three-dimensions and forming a 3-D geometric database model therefrom;
   b) obtaining one or more specified receive locations within said 3-D geometric database model where RF energy distribution is desirable;
   c) simulating the propagation of an RF signal within said geometric database model, said RF signal being represented as a beam having magnitude and direction, said simulation including querying said database model to trace said beam in said geometric environment; and,
   d) determining one or more intersections of said traced beam with one or more receive locations to determine RF energy distribution at said locations.

2. A method for simulating RF energy distribution according to claim 1, wherein said step of providing a binary tree representation of said geometric environment includes the steps of:
   obtaining knowledge of a geometric environment in three-dimensions; and
   partitioning said geometric environment in three-dimensions and modelling said environment as a binary tree, said binary tree containing nodes representing partitions of said geometric environment and leaves representing partitioned regions in said geometric environment.

3. A method for simulating RF energy distribution according to claim 2, wherein said partitioning step includes incorporating hyperplanes to represent surfaces of objects in said geometric model.

4. A method for simulating RF energy distribution according to claim 2, wherein said partitioning step includes the step of classifying said region leaves as in-cell regions representing inside an object in said environment and out-cell regions representing a region outside an object in said environment.

5. A method for simulating RF energy distribution according to claim 4, wherein said simulating step c) includes the step of determining an intersection of said beam with an object in said environment, said beam being represented as a ray having magnitude and direction, and said intersection occurring when said representative ray goes from an out cell leaf classification to an in cell leaf classification or from an in cell leaf classification to an out cell leaf classification.

6. A method for simulating RF energy distribution according to claim 5, further including the step of determining beam extents for said intersecting beam, said beam extents determined by calculating a solid angle for said beam and determining an angle of incidence its representative ray makes with said intersected object.

7. A method for simulating RF energy distribution according to claim 5, wherein said step of determining an intersection of a beam with an object in said environment includes determining magnitude and direction of its representative ray reflected from and a ray transmitted through said object, and further simulating the propagation of corresponding reflected and transmitted beams in said environment.

8. A method for simulating RF energy distribution according to claim 7, wherein said step of determining magnitude and direction of a reflected beam includes determining angle of incidence between its representative ray and said object, and attenuating said beam in accordance with material attributes of said intersected object.

9. A method for simulating RF energy distribution according to claim 6, further including the step of determining whether said beam has intersected an edge of said object, said step further including determining a distribution of rays representing beams diffracting from said edge and further simulating the propagation of each said diffracting beams in said environment.

10. A method for simulating RF energy distribution according to claim 1, wherein said simulating step c) further includes:
    e) determining intersections of said beam with objects in said environment;
    f) comparing a magnitude of a current intersecting beam with a user-defined threshold; and, repeating steps e) and f) until the magnitude of a current intersecting beam is below said threshold.

11. A method for simulating RF energy distribution according to claim 1, wherein said step of obtaining one or more specified receive locations within said 3-D geometric database model includes obtaining one or more specified RF power sampling planes for integration in said model.

12. A method for simulating RF energy distribution according to claim 11, wherein each of said one or more RF sampling planes are at multiple heights in said environment.

13. A method for simulating RF energy distribution according to claim 11, wherein said step d) of determining an intersection of said beam includes the steps of:
    determining intersection of its representative ray with said RF power sampling plane;
    calculating extents of said beam;
    determining from said extents coverage of said beam at said one or more receive locations; and,
    recording an RF power level at each said one or more receive locations.

14. A method for simulating RF energy distribution according to claim 13, wherein said step of calculating beam extents includes the step of calculating a solid angle for said beam and determining an angle of incidence its representative ray makes with said RF sampling plane.

15. A method for simulating RF energy distribution according to claim 6, wherein said simulating step further includes the step of subdividing said beam into child beams and simulating the propagation of each child beam within said environment, said subdividing step including partitioning an extent area according to current beam power and distance its representative ray has travelled since a previous intersection or originating point.

16. A method for simulating RF energy distribution according to claim 6, further including the step of representing said geometric environment in a first coordinate system, the simulating step including representing said beam as a ray for propagation from an origin within said first coordinate system.

17. A method for simulating RF energy distribution according to claim 16, wherein the step of computing beam extents includes computing a solid angle for said beam in a second coordinate system.

18. A method for simulating RF energy distribution according to claim 6, wherein said simulating step further includes the step of specifying the location of a beam originating transmitter within said database model from which said beams propagate from.

19. A method for simulating RF energy distribution according to claim 18, further including the step of obtaining a specified transmitter antenna type and gain pattern.

20. A method for simulating RF energy distribution according to claim 19, wherein said transmitter antenna is represented as an antenna surface, said method further including tessellating said antenna surface in order to determine initial beam extents for each propagating beam.

21. A method for simulating RF energy distribution according to claim 20, wherein said transmitter antenna surface is tesselated as a plurality of polygonal shapes, said beam extents calculated in accordance with said polygonal shape.

22. A method for simulating RF energy distribution according to claim 1, wherein said geometric environment includes an indoor environment.

23. A method for simulating RF energy distribution according to claim 1, wherein said geometric environment includes an outdoor environment.

24. A method for simulating RF energy distribution according to claim 1, wherein said geometric environment includes a terrain environment.

25. A method for simulating RF energy distribution according to claim 1, wherein said geometric environment includes a combination of two or more of indoor, outdoor, and terrain environments.

26. A system for simulating RF energy distribution comprising:

a) means for obtaining a binary tree representation of a geometric environment in three-dimensions and forming a 3-D geometric database model therefrom;

b) means for obtaining one or more specified receive locations within said 3-D geometric database model where RF energy distribution is to be determined, said means further obtaining locations of one or more specified RF transmitters within said 3-D geometric database model, said transmitters for propagating an RF signal represented as a beam having magnitude and direction;

c) means for querying said database model to simulate the propagation of said beam in said geometric environment; and, d) means for determining one or more intersections of said beam with one or more receive locations to determine RF energy distribution at said locations.

27. A system for simulating RF energy distribution according to claim 26, wherein said obtaining means further obtains specified parameters for controlling the RF simulation, said specified parameters including a type of antenna transmitter, an antenna gain pattern, and an RF transmitter frequency.

28. A system for simulating RF energy distribution according to claim 26, wherein said obtaining means further obtains specified material attributes for objects modelled in said 3-D geometric database model.

29. A system for simulating RF energy distribution according to claim 26, wherein said obtaining means includes an interactive display device enabling a user to visualize said geometric environment in three-dimensions.

30. A system for simulating RF energy distribution according to claim 26, wherein said interactive display device includes means for enabling a user to specify one or more of said receive locations within said displayed geometric environment and to specify said locations of one or more RF transmitters within said displayed geometric environment.

* * * * *